(12) United States Patent
Maeda (10) Patent No.: US 10,988,119 B2
(45) Date of Patent: Apr. 27, 2021

(54) PARKING LOCK DEVICE FOR VEHICLE

(71) Applicant: TOYOTA JIDOSHA KABUSHIKI KAISHA, Toyota (JP)

(72) Inventor: Naoaki Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 16/560,428

(22) Filed: Sep. 4, 2019

(65) Prior Publication Data

US 2020/0094791 A1    Mar. 26, 2020

(30) Foreign Application Priority Data

Sep. 26, 2018 (JP) .............................. JP2018-180978

(51) Int. Cl.
*B60T 1/00*        (2006.01)
*F16H 63/34*       (2006.01)

(52) U.S. Cl.
CPC .......... *B60T 1/005* (2013.01); *F16H 63/3433* (2013.01)

(58) Field of Classification Search
None
See application file for complete search history.

(56) References Cited

U.S. PATENT DOCUMENTS 6,354,422 B1 * 3/2002 Kim ........................ B60T 1/005
188/31

FOREIGN PATENT DOCUMENTS

| JP | 2009-143363 A | 7/2009 |
| JP | 2010-265974 A | 11/2010 |
| JP | 2014-034276 A | 2/2014 |

* cited by examiner

*Primary Examiner* — Timothy Hannon
(74) *Attorney, Agent, or Firm* — Oliff PLC (57) ABSTRACT

A parking lock device for a vehicle includes a parking gear, a locking pawl, and a cam mechanism. The parking gear includes a parking lock gear that includes outer teeth that engage with a locking lug and rotates about a rotation axis, and a parking lock gear base fixed to an output shaft and allowed to rotate relative to the parking lock gear about the rotation axis. A space is provided between the parking lock gear and the parking lock gear base, such that the space expands and contracts in a circumferential direction according to relative rotation of the parking lock gear and the parking lock gear base, and an elastic body is provided in the space in a pre-compressed state.

7 Claims, 8 Drawing Sheets

FIG. 8

PARKING LOCK DEVICE FOR VEHICLE

CROSS-REFERENCE TO RELATED APPLICATIONS

This application claims priority to Japanese Patent Application No. 2018-180978 filed on Sep. 26, 2018, which is incorporated herein by reference in its entirety.

BACKGROUND

1. Technical Field

The disclosure relates to a parking lock device for a vehicle, and in particular to the structure of a parking gear.

2. Description of Related Art

A parking lock device for a vehicle is known which includes a parking gear provided on a rotating member connected to a drive wheel, a locking pawl including a locking lug capable of engaging with the parking gear and configured to be pivotally turned between a locked state in which the locking lug engages with the parking gear, and a non-locked state in which the locking lug is disengaged from the parking gear, and a cam mechanism including a locking cam inserted between a position fixed member and the locking pawl and configured to pivotally turn the locking pawl by moving the locking cam in parallel with a rotation axis of the parking gear. One example of the vehicular parking lock device is described in Japanese Unexamined Patent Application Publication No. 2009-143363 (JP 2009-143363 A). In the vehicular parking lock device described in JP 2009-143363 A, the locking lug and the parking gear are engaged with each other, to establish the locked state, so that rotation of the rotating member on which the parking gear is integrally mounted is stopped.

SUMMARY

When the driver performs parking lock operation, by operating a shift lever to a parking position, for example, the vehicular parking lock device described in JP 2009-143363 A is placed in the locked state, so as to stop rotation of the rotating member connected to the drive wheel. However, in the vehicular parking lock device described in JP 2009-143363 A, when the parking lock operation is performed, for example, the shift lever is moved by the driver to the parking position, during traveling of the vehicle, or in a condition where the vehicle is not completely stopped, the parking gear and the locking lug are engaged with each other, in a condition where torque remains in the rotating member, for example, in a condition where torque is applied to the rotating member to rotate the same. As a result, torsional torque of a power transmission mechanism is applied from the parking gear to the locking pawl including the locking lug, for example, and frictional force between the parking gear and the cam mechanism is increased, which may result in increase of the applied load during shifting, or a load on re-operation of the shift lever.

This disclosure provides a parking lock device for a vehicle, which includes a parking gear that can release torque that remains in a rotating member when the parking lock device is placed in a locked state in a condition where torque remains in the rotating member.

One aspect of the disclosure provides a parking lock device for a vehicle, which includes a parking gear, a locking pawl, and a cam mechanism. The parking gear is provided on a rotating member connected to a drive wheel. The locking pawl includes a locking lug capable of engaging with the parking gear, and is configured to be pivotally turned between a locked state in which the locking lug is engaged with the parking gear, and a non-locked state in which the locking lug is disengaged from the parking gear. The cam mechanism includes a locking cam inserted between a position fixed member and the locking pawl, and is configured to pivotally turn the locking pawl by moving the locking cam in parallel with a rotation axis of the parking gear. The parking gear includes a parking lock gear including a plurality of outer teeth adapted to engage with the locking lug and configured to rotate about the rotation axis, and a parking lock gear base fixed to the rotating member and configured to rotate relative to the parking lock gear about the rotation axis. A space is provided between the parking lock gear and the parking lock gear base, and the space expands and contracts in a circumferential direction in accordance with relative rotation of the parking lock gear and the parking lock gear base. An elastic body is provided in the space in a pre-compressed state.

In the vehicular parking lock device of the above aspect, the parking gear includes the parking lock gear that includes the outer teeth adapted to engage with the locking lug, and rotates about the rotation axis, and the parking lock gear base that is fixed to the rotating member such that it can rotate relative to the parking lock gear about the rotation axis. The space, which is provided between the parking lock gear and the parking lock gear base, expands and contracts in the circumferential direction in accordance with relative rotation of the parking lock gear and the parking lock gear base. In the space, the elastic body is provided in a pre-compressed state. With this arrangement, when the parking lock device is placed in the locked state in which the locking lug and the parking gear engage with each other, in a condition where torque is applied to the rotating member, or in a condition where torque remains in the rotating member, the torque remaining in the rotating member is released by means of the elastic body provided in the space, and is less likely or unlikely to be applied from the parking gear to the locking lug. Thus, increase of the load on operation of the shift lever, for example, can be curbed.

In the parking lock device as described above, the outer teeth may be arranged at substantially equal intervals in an outer peripheral portion of the parking lock gear, and the locking pawl may be placed in the locked state when the locking lug provided on the locking pawl is engaged with the outer teeth, and may be placed in the non-locked state when the locking lug is disengaged from the outer teeth.

With the above arrangement, the parking lock device can be reliably placed in the locked state when the locking lug is engaged with the outer teeth, and can be reliably placed in the non-locked state when the locking lug is disengaged from the outer teeth.

In the parking lock device as described above, the elastic body may include a first circumferential end portion in a circumferential direction, the first circumferential end portion being in contact with the parking lock gear, and the elastic body may include a second circumferential end portion in a circumferential direction, the second circumferential end portion being in contact with the parking lock gear base. The second circumferential end portion is opposite to the first circumferential end portion.

With the above arrangement, one circumferential end portion of the elastic body is in contact with the parking lock gear, and the other circumferential end portion is in contact with the parking lock gear base. Thus, torque that remains in the rotating member can be more reliably released by the elastic body.

In the parking lock device as described above, the elastic body may be provided between the rotating member and the outer teeth as viewed in a radial direction of the parking gear.

With the above arrangement, the elastic body is provided between the rotating member and the outer teeth as viewed in the radial direction of the parking gear. Thus, torque that remains in the rotating member can be more reliably released by the elastic body, at a location between the rotating member and the outer teeth.

In the parking lock device as described above, the elastic body may be a spring.

Since the elastic body is the spring, torque that remains in the rotating member can be released between the rotating member and the outer teeth, by means of more inexpensive components.

In the parking lock device as described above, the parking lock gear may be provided with a groove portion that extends in the circumferential direction and extends through the parking lock gear in a direction of the rotation axis. The parking lock gear base may be provided with a protruding portion that is smaller in the circumferential direction than the groove portion and is allowed to be inserted into the groove portion. The space may be provided between the parking lock gear and the parking lock gear base, such that the space is surrounded by the groove portion and the protruding portion, the protruding portion being inserted into the groove portion.

With the above arrangement, the parking lock gear is provided with the groove portion that extends in the circumferential direction, and extends through the parking lock gear in the direction of the rotation axis. The parking lock gear base is provided with the protruding portion that is smaller in the circumferential direction than the groove portion, and is allowed to be inserted into the groove portion. The space, which is provided between the parking lock gear and the parking lock gear base, is surrounded by the groove portion into which the protruding portion is inserted, and the protruding portion. Thus, the space is provided in a simple structure between the parking lock gear and the parking lock gear base; therefore, the size of the parking gear is less likely or unlikely to be increased.

In the parking lock device as described above, the parking lock gear base may be provided with a groove portion that extends in the circumferential direction and extends through the parking lock gear base in a direction of the rotation axis, and the parking lock gear may be provided with a protruding portion that is smaller in the circumferential direction than the groove portion and is allowed to be inserted into the groove portion. The space may be provided between the parking lock gear and the parking lock gear base, such that the space is surrounded by the groove portion and the protruding portion, the protruding portion being inserted into the groove portion.

With the above arrangement, the parking lock gear base is provided with the groove portion that extends in the circumferential direction, and extends through the parking lock gear base in the direction of the rotation axis. The parking lock gear is provided with the protruding portion that is smaller in the circumferential direction than the groove portion, and is allowed to be inserted into the groove portion. The space, which is provided between the parking lock gear and the parking lock gear base, is surrounded by the groove portion into which the protruding portion is inserted, and the protruding portion. Thus, the space is provided in a simple structure between the parking lock gear and the parking lock gear base; therefore, the size of the parking gear is less likely or unlikely to be increased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

While this disclosure is applied to an engine-driven vehicle, it may be applied to a hybrid vehicle, or the like, including an engine and a rotating machine for propelling the vehicle, i.e., a motor for driving, as driving power sources for propelling the vehicle, or an electric vehicle including only an electric motor as a driving power source. A transverse-mounted transaxle of FF (front-engine, front-drive) type, or the like, in which two or more shafts are arranged along a vehicle width direction, is preferably used as a power transmission system for the vehicle. However, the power transmission system may be of FR (front-engine, rear-drive) type, or four-wheel drive type.

A parking lock device for a vehicle according to each embodiment of the disclosure will be described in detail with reference to the drawings. In the drawings, components or parts in the embodiments described below are simplified or modified as needed, and the ratio of dimensions, shape, etc. of each component or part are not necessarily correctly depicted.

Figure 1:
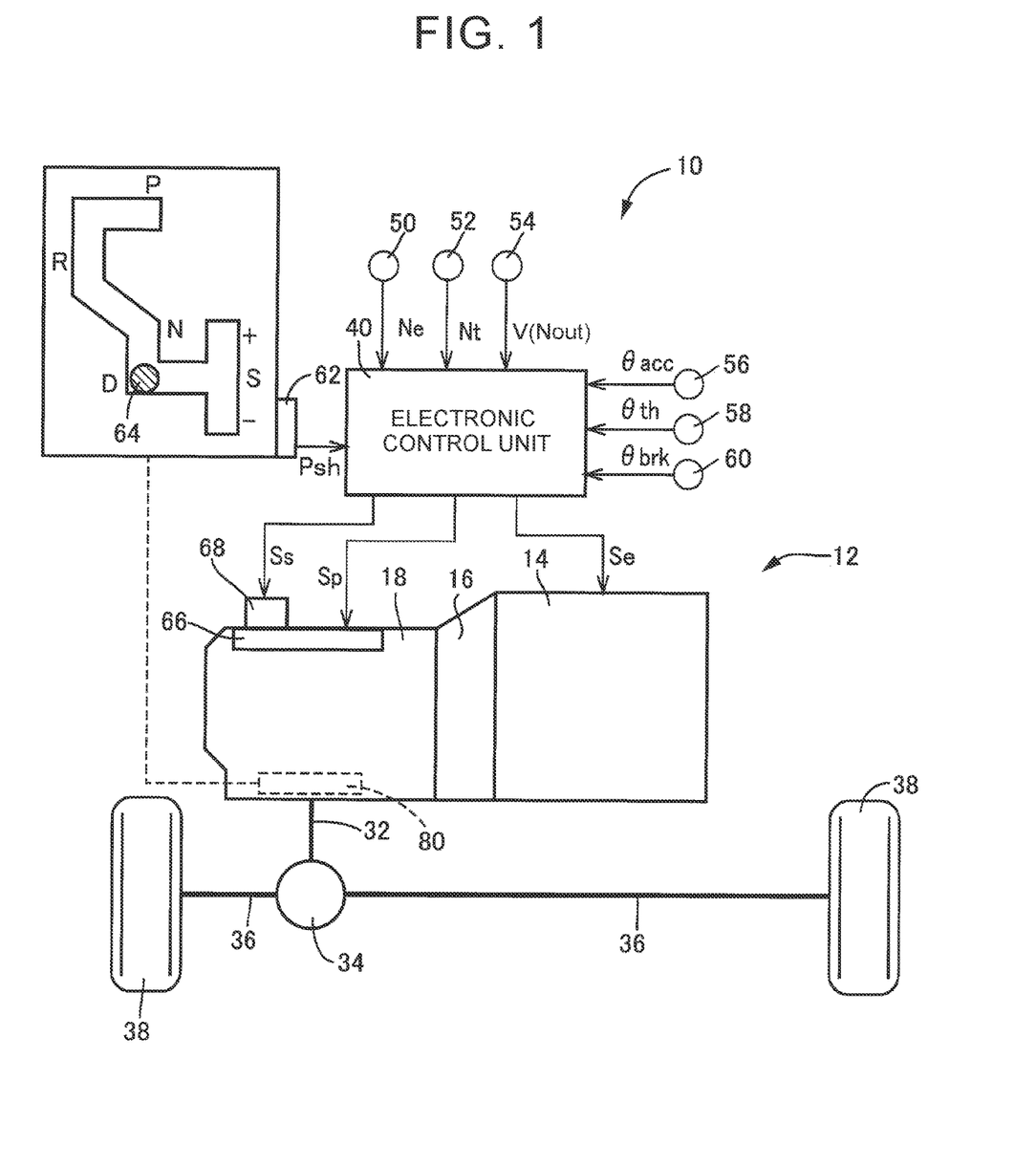
FIG. 1 is a skeleton diagram illustrating a principal part of a vehicle in which a vehicular parking lock device of a first embodiment of the disclosure is used.

Initially, a parking lock device for a vehicle according to a first embodiment of the disclosure will be described. FIG. 1 is a skeleton diagram illustrating a principal part of a vehicle 10 in which the vehicular parking lock device of the first embodiment is used. The vehicle 10 includes an engine 14 that functions as a driving power source for propelling the vehicle 10, drive wheels 38, and a power transmission system 12 provided between the engine 14 and the drive wheels 38. The power transmission system 12 includes a torque converter 16 as a fluid transmission device coupled to the engine 14, input shaft (not shown) which is coupled to the torque converter 16 and receives power transmitted from the engine 14, output shaft 32 that delivers the power received by the input shaft, differential gear device 34 coupled to the output shaft 32, and so forth. In the power transmission system 12 shown in FIG. 1, drive torque generated by the engine 14 that functions as the drive power source is transmitted to right and left drive wheels 38, via the torque converter 16, transmission 18, output shaft 32, differential gear device 34, and a pair of axles 36.

The vehicle 10 includes an electronic control unit 40 corresponding to a controller that performs controls, such as output control of the engine 14 and shift control of the transmission 18. The electronic control unit 40 includes a so-called microcomputer including, for example, a central processing unit (CPU), random access memory (RAM), read-only memory (ROM), input-output interface, and so forth. The CPU performs signal processing according to programs stored in advance in the ROM, while utilizing the temporary storage function of the RAM, so as to carry out various controls of the vehicle 10.

The electronic control unit 40 is supplied with various input signals detected by various sensors included in the vehicle 10. For example, the electronic control unit 40 is supplied with an engine speed Ne (rpm), an input shaft speed Nin (rpm) as a turbine speed Nt (rpm), an output shaft speed Nout (rpm) corresponding to a vehicle speed V (km/h), an accelerator operation amount θacc (%), a throttle opening θth (%), a brake operation amount θbrk (%) representing the magnitude of decelerating operation by the driver, an operation position Psh of a shift lever 64 included in the vehicle 10, etc., based on detection signals obtained by an engine speed sensor 50, input shaft speed sensor 52, output shaft speed sensor 54, accelerator position sensor 56, throttle opening sensor 58, brake operation amount sensor 60, shift position sensor 62, etc. Also, the electronic control unit 40 outputs an engine output control signal Se for output control of the engine 14, hydraulic control command signal Sp for hydraulic control, such as shift control of the transmission 18, shift command signal Ss for controlling switching of the shift range, and so forth. The hydraulic control command signal Sp is an engagement command signal for actuating a solenoid valve (not shown) so as to change the gear position of the transmission 18, for example. The hydraulic control command signal Sp is transmitted to a hydraulic control circuit 66. The shift command signal Ss is transmitted to a shift actuator 68.

The shift lever 64 is installed in the vicinity of the driver's seat, for example, and can be selectively operated to a P position, R position, N position, D position, and S position, as shown in FIG. 1. The P position is a parking position. In the parking position, the transmission 18 is placed in a neutral condition in which a power transmission path in the transmission 18 is released, and power transmission in the transmission 18 is cut off. Also, in the parking position, rotation of an output gear (not shown) of the transmission 18 is mechanically inhibited or locked by the vehicular parking lock device 80 in the transmission 18. The R position is a reverse-drive position in which the rotational direction of the output gear (not shown) of the transmission 18 is reversed, for example. The N position is a neutral position in which the transmission 18 is placed in a neutral condition in which power transmission is cut off. The D position is a forward-drive position in which automatic shift control is performed using all forward gear positions in a shift range, or D range, where the transmission 18 is allowed to be shifted up or down, for example. The S position is a forward-drive position in which the transmission 18 can be manually shifted up or down, by switching two or more types of shift ranges that limit a range of change of gear positions, namely, two or more types of shift ranges having different high-vehicle-speed gear positions.

Figure 2:
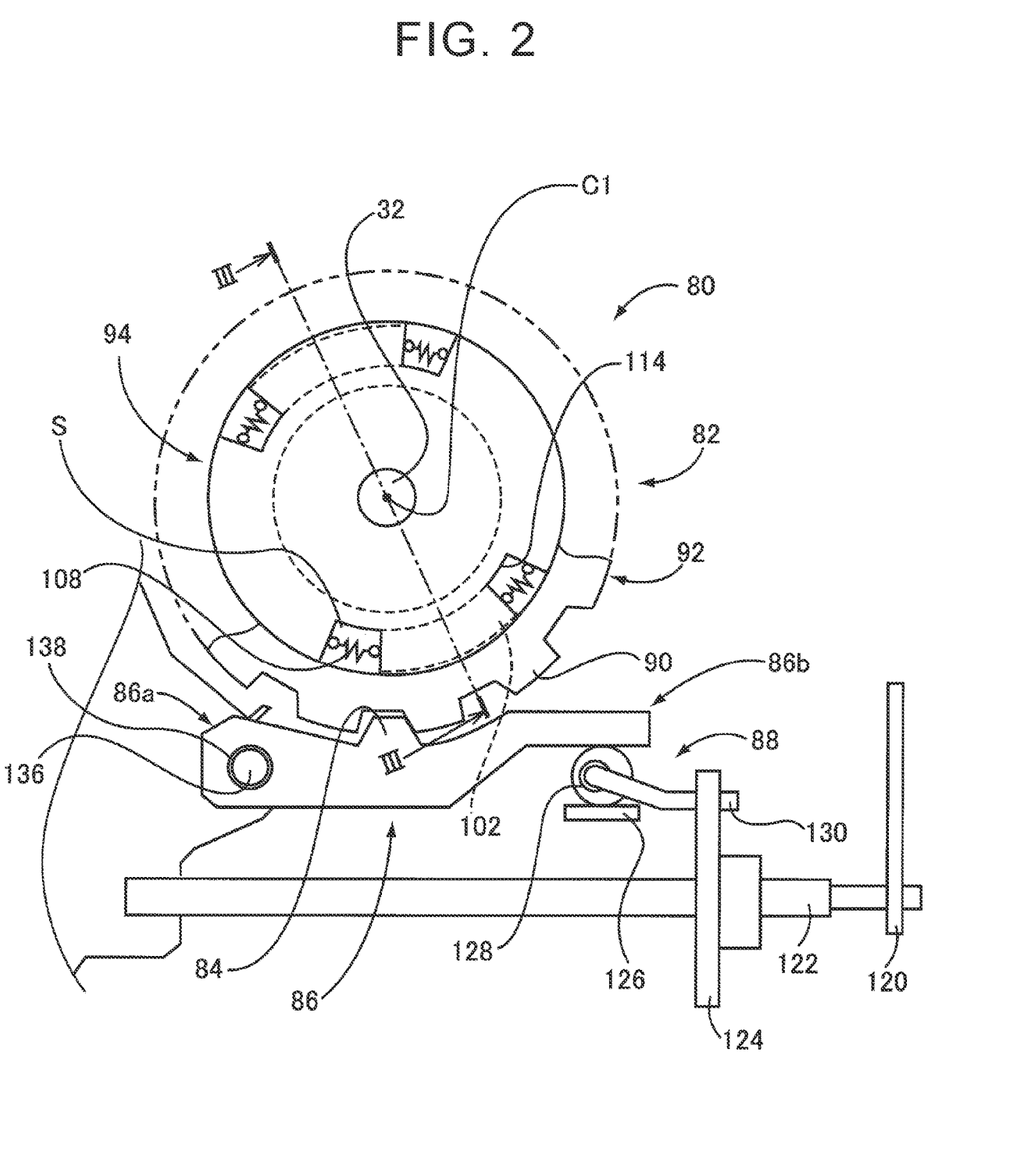
FIG. 2 is a schematic view illustrating the configuration of the vehicular parking lock device provided in a transmission of the vehicle shown in FIG. 1.

FIG. 2 is a schematic view illustrating the configuration of the vehicular parking lock device 80. The vehicular parking lock device 80 includes a parking gear 82 provided on a rotating member connected to the drive wheels 38, for example, the output shaft 32 of the transmission 18. Also, the vehicular parking lock device 80 includes a locking pawl 86 including a locking lug 84 that engages with the parking gear 82, and a cam mechanism 88 that pivotally turns the locking pawl 86. In operation of the vehicle 10, the locking pawl 86 is pivotally turned by the cam mechanism 88, and the locking lug 84 of the locking pawl 86 is brought into engagement with the parking gear 82, so that rotation of the output shaft 32 is inhibited. The vehicular parking lock device 80 is selectively placed in a locked state in which the locking lug 84 and the parking gear 82 are engaged with each other, or a non-locked state in which the locking lug 84 and the parking gear 82 are not engaged with each other. The vehicular parking lock device 80 is placed in the locked state, when the shift lever 64 is moved by the driver to the parking position, so as to generate a lock command based on a parking lock command of the driver, or operation of the shift lever 64, for example. FIG. 2 shows the locked state in which the locking lug 84 of the locking pawl 86 is engaged with the parking gear 82.

Figure 3:
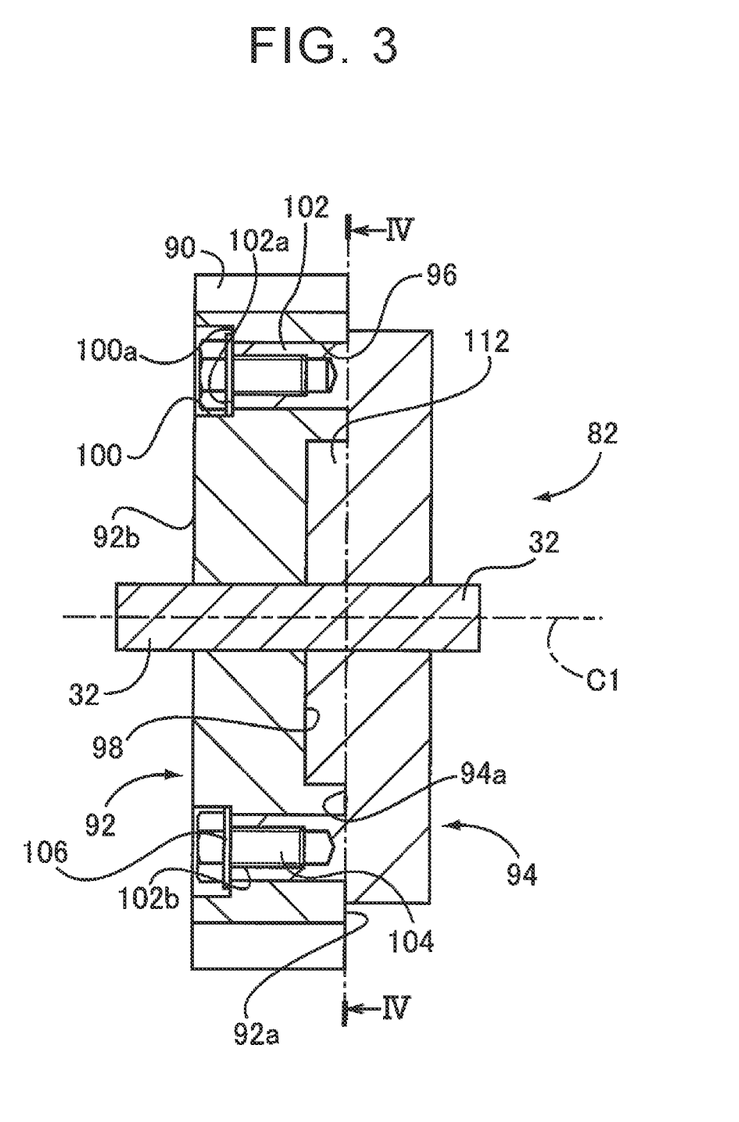
FIG. 3 is a cross-sectional view taken along line III-III in FIG. 2, showing a principal part of a parking gear shown in FIG. 2.
Figure 4:
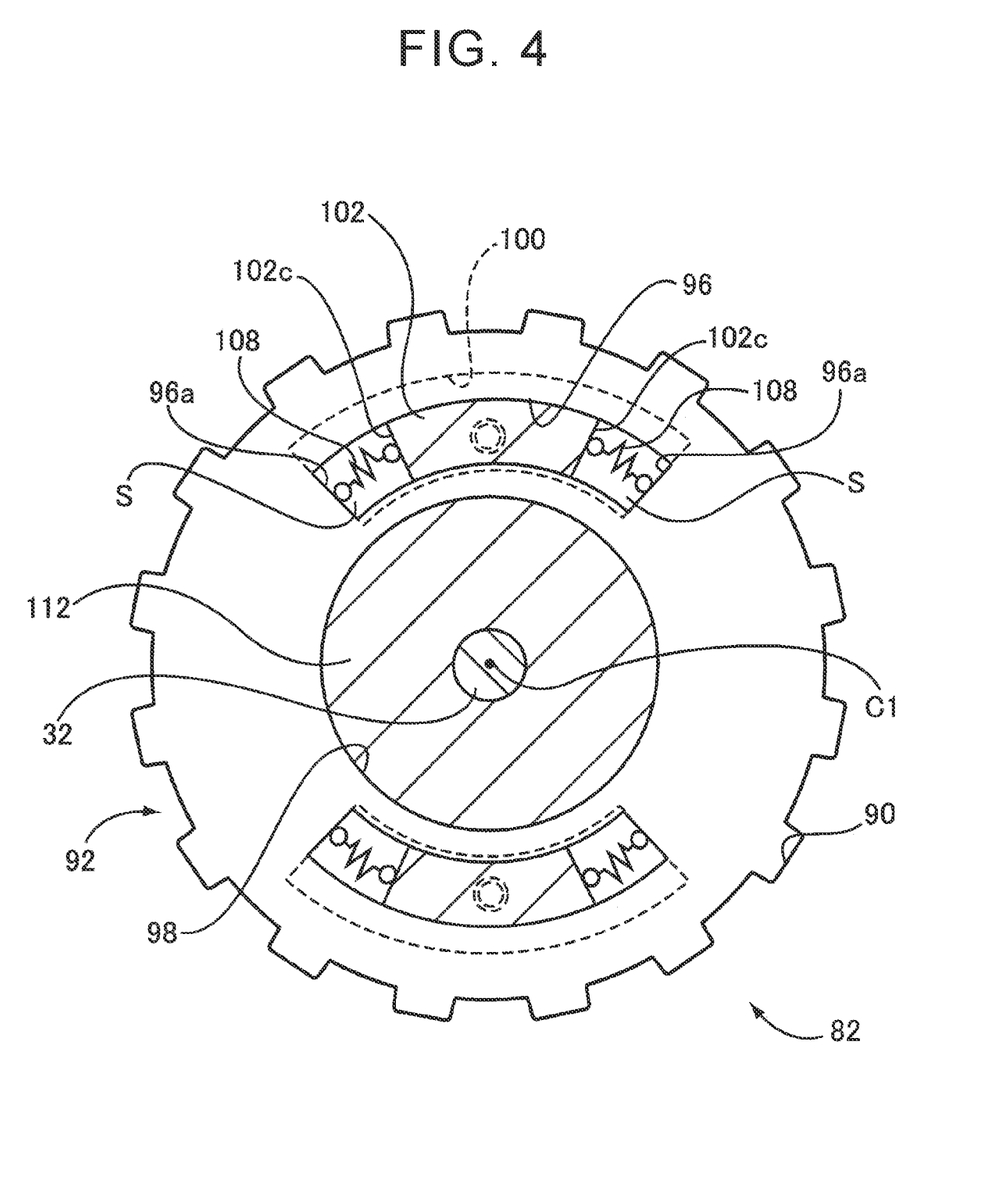
FIG. 4 is a cross-sectional view taken along line IV-IV in FIG. 3, which is also a front view showing a principal part of the parking gear of FIG. 3

FIG. 3 is a cross-sectional view taken along line III-III in FIG. 2, and shows a principal part of the parking gear 82. As shown in FIG. 3, the parking gear 82 includes a parking lock gear 92 and a parking lock gear base 94. The parking lock gear 92 includes outer teeth 90 that engage with the locking lug 84, and rotates relative to the output shaft 32, about a rotation axis C1 of the output shaft 32. The parking lock gear base 94 is fixed to the output shaft 32, and is rotatable relative to the parking lock gear 92 about the rotation axis C1. While a part of the outer periphery of the parking lock gear 92 is omitted as indicated by a two-dot chain line in FIG. 2, a plurality of outer teeth 90 is provided at equal intervals as shown in FIG. 4 that will be described later. In the parking gear 82, the parking lock gear 92 and parking lock gear base 94 provided generally in the shape of discs are located adjacent to each other and overlap each other, in their thickness directions, or the direction of the rotation axis C1, as shown in FIG. 3. The parking gear 82 is rotated about the output shaft 32, in accordance with rotation of the output shaft 32, for example.

FIG. 4 is a cross-sectional view taken along line IV-IV in FIG. 3. As shown in FIG. 3 and FIG. 4, arcuate groove portions 96 that extend in the circumferential direction and are open to one side face 92a are provided in the parking lock gear 92. The groove portions 96 extend through the parking lock gear 92, in the thickness direction of the parking lock gear 92. Two or more groove portions 96 are provided at given intervals in the circumferential direction of the side face 92a. In the first embodiment, a total of two groove portions 96 are provided in the parking lock gear 92 at substantially equal intervals. The parking lock gear 92 is provided with a first recessed portion 98 having a circular shape about the rotation axis C1 and a bottom, and the first recessed portion 98 is open to the one side face 92a. An embossed portion 112 provided on the parking lock gear base 94 is fitted in the first recessed portion 98. The groove portions 96 are provided between the first recessed portion 98 and the outer teeth 90, as viewed in radial directions of the parking lock gear 92. Each of the groove portions 96 is open to the side face 92a, in a generally fan-like shape, such that it has a certain length in a radial direction of the parking lock gear 92, and extends in the circumferential direction along a rotation circle about the rotation axis C1, for example, between the root of the outer teeth 90 and the first recessed portion 98. The parking lock gear 92 is provided at the other side face 92b with second recessed portions 100. Each of the second recessed portions 100 has a larger radial dimension than the opening of the groove portion 96 provided in the side face 92a, and extends in the circumferential direction such that it is open to the other side face 92b. The second recessed portions 100 communicate with the groove portions 96.

As shown in FIG. 3, the parking lock gear base 94 is provided with the circular embossed portion 112 on one side face 94a closer to the parking lock gear 92, such that the embossed portion 112 is fitted in the first recessed portion 98, in a condition where the parking lock gear base 94 is located adjacent to the parking lock gear 92.

On the side face 94a of the parking lock gear base 94, arcuate protruding portions 102 are provided such that they can be inserted into the groove portions 96. Two or more protruding portions 102 are provided at given intervals in the circumferential direction of the side face 94a, such that they can be inserted into the groove portions 96. In the first embodiment, a total of two protruding portions 102 are provided on the parking lock gear base 94 at substantially equal intervals. Each of the protruding portions 102 has a certain length in a radial direction of the parking lock gear base 94, and extends along the corresponding groove portion 96, in a generally fan-like shape, in the circumferential direction along a rotation circle about the rotation axis C1, for example. The protruding portion 102 protrudes in the thickness direction of the parking lock gear base 94. The outer periphery of the protruding portion 102 is located radially inward of the outer periphery of the parking lock gear base 94. The length of the protruding portion 102 as measured in the thickness direction is equal to a length or dimension from the side face 92a of the parking lock gear 92 to a bottom face 100a of the second recessed portion 100. Namely, when the protruding portion 102 is inserted in the groove portion 96, and the side face 92a and the side face 94a abut against each other, a distal end face 102a of the protruding portion 102 is located at the same position as the bottom face 100a, as viewed in the direction of the rotation axis C1.

Each of the protruding portions 102 is provided with a female screw hole 102b that is open to the distal end face 102a and has a certain depth. The depth of the female screw hole 102b is smaller than the length of the protruding portion 102 as measured in the thickness direction, for example. A bolt 104, which is inserted from the second recessed portion 100, is screwed into the female screw hole 102b via a washer 106. The washer 106 is interposed between a head portion of the bolt 104, and the bottom face 100a of the second recessed portion 100 and the distal end face 102a of the protruding portion 102. Also, the washer 106 has a smaller radial dimension than the opening of the second recessed portion 100. Thus, the parking lock gear 92 and the parking lock gear base 94 are fixed to each other with the bolt 104, such that they can slide against each other, and the parking lock gear 92 and the parking lock gear base 94 can rotate relative to each other.

The parking lock gear base 94 is provided with cutouts 114 at circumferentially opposite sides of each protruding portion 102, as shown in FIG. 2 and FIG. 4. The cutouts 114 are formed by cutting out the parking lock gear base 94 in a groove-like form, in the thickness direction of the parking lock gear base 94. The protruding portion 102 is smaller in the circumferential direction than the groove portion 96. More specifically, the length of the outer periphery of the groove portion 96 is substantially equal to the total length of the outer peripheries of the protruding portion 102 and the cutouts 114 on the circumferentially opposite sides of the protruding portion 102. The length of the inner periphery of the groove portion 96 is substantially equal to the total length of the inner peripheries of the protruding portion 102 and the cutouts 114 on the circumferentially opposite sides of the protruding portion 102. When the protruding portion 102 is inserted in the groove portion 96, spaces S are provided in the groove portion 96. Each space S is surrounded by three walls of the groove portion 96 including a circumferential wall 96a, and a circumferential end face 102c of the protruding portion 102. The spaces S are provided in the groove portions 96, namely, in the parking lock gear 92. In the first embodiment, each protruding portion 102 is inserted into the corresponding groove portion 96, such that the space S is provided on each of the circumferentially opposite sides of the protruding portion 102 within the groove portion 96. In the first embodiment, a total of four spaces S are provided. In each of the spaces S, an elastic body, such as a coiled spring 108, is mounted in a pre-compressed state. The spring 108 is mounted such that one circumferential end portion of the spring 108 contacts with the circumferential wall 96a of the groove portion 96, namely, with the parking lock gear 92, and the other circumferential end portion contacts with the circumferential end face 102c of the protruding portion 102, namely, with the parking lock gear base 94. As shown in FIG. 2 and FIG. 4, the spaces S are provided between the output shaft 32 and the outer teeth 90, in the radial directions of the parking gear 82, or in the radial directions of the parking lock gear 92. Namely, the springs 108 are provided between the output shaft 32 and the outer teeth 90 in the radial directions of the parking gear 82.

In the first embodiment, the parking lock gear 92 is provided such that it can rotate relative to the output shaft 32, and the parking lock gear base 94 is provided such that it cannot rotate relative to the output shaft 32, and can rotate relative to the parking lock gear 92. With this arrangement, the spaces S are expanded and contracted in the circumferential direction, in accordance with relative rotation of the parking lock gear 92 and the parking lock gear base 94, so that the springs 108 mounted in the spaces S are also expanded and contracted.

Referring back to FIG. 2, the vehicular parking lock device 80 includes a control lever 120, control shaft 122, and manual valve lever 124. The control lever 120 is pivotally turned in association with operation of the shift lever 64. The control shaft 122 rotates in accordance with operation of the shift lever 64, via the control lever 120. The manual valve lever 124 is fixed to the control shaft 122 such that the lever 124 cannot rotate relative to the control shaft 122, and is provided pivotally about the axis of the control shaft 122. The cam mechanism 88 is coupled to the manual valve lever 124. As shown in FIG. 2, the locking pawl 86 included in the vehicular parking lock device 80 includes a proximal end portion 86a that is pivotally supported by a locking pawl shaft 136, and a distal end portion 86b that is in sliding contact with a locking cam 128. The locking pawl 86 further includes the locking lug 84 to be engaged with the outer teeth 90, at a substantially middle portion in the longitudinal direction.

Figure 5:
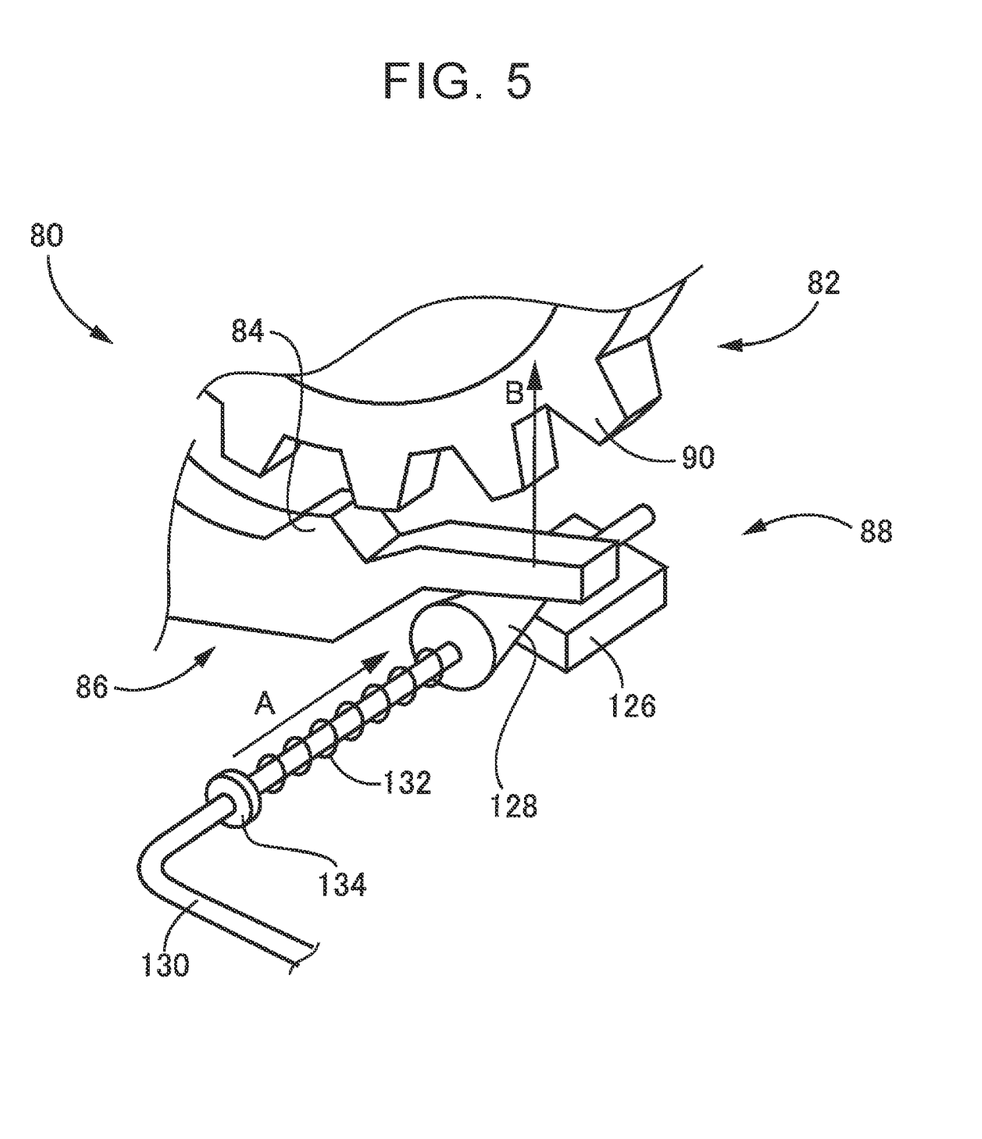
FIG. 5 is a perspective view of the vehicular parking lock device shown in FIG. 2, which is also an enlarged view of a part of the vehicular parking lock device.

FIG. 5 is a perspective view of the vehicular parking lock device 80, and is also an enlarged view of a part of the vehicular parking lock device 80. The cam mechanism 88 includes the locking cam 128, and an L-shaped locking rod 130. The locking cam 128 is inserted and interposed between a position fixed member 126 and the locking pawl 86. The locking rod 130 is coupled at its proximal end portion to the manual valve lever 124, and the locking cam 128 is attached to its distal end portion, such that the locking rod 130 can move in parallel with the rotation axis C1. As shown in FIG. 5, the locking cam 128 is provided in a substantially conical shape having a tapered cam surface, and its diameter becomes smaller toward the distal end of the locking rod 130. The locking rod 130 is provided with a cam spring 132 interposed between the locking cam 128 and a spring seat 134. The cam spring 132 biases the locking cam 128 in a direction from the large-diameter side to the small-diameter side of the locking cam 128, namely, in a direction of arrow A shown in FIG. 5. When the shift lever 64 is operated by the driver to the parking position (P position), for example, the locking cam 128 is moved in the direction of arrow A, by the manual valve lever 124 that rotates in accordance with rotation of the control shaft 122, via the locking rod 130. FIG. 5 shows a condition in which the locking lug 84 of the locking pawl 86 is not engaged with the parking gear 82.

When the shift lever 64 is moved to the parking position according to a parking lock command generated by the driver, for example, the locking cam 128 is pushed in the direction of arrow A, so that the locking pawl 86 is pushed up in a direction of arrow B in FIG. 5, and is pivotally turned counterclockwise about the locking pawl shaft 136. As shown in FIG. 2, with the locking pawl 86 thus pivotally turned by the locking cam 128, the vehicular parking lock device 80 is placed in the locked state in which the locking lug 84 and the outer teeth 90 of the parking lock gear 92, namely, the locking lug 84 and the parking gear 82, are engaged with each other. The locking pawl 86 is constantly biased by a return spring 138, in a such a direction as to disengage the locking lug 84 from the parking gear 82, namely, in a direction opposite to the direction of arrow B in FIG. 5.

In the meantime, when the shift lever 64 is moved to the parking (P) position during traveling of the vehicle 10 or before the vehicle 10 completely stops, for example, the locking lug 84 of the locking pawl 86 and the parking gear 82 are engaged with each other, while the vehicular parking lock device 80 is in a condition where torque remains in the output shaft 32, for example, in a condition where torque is applied to the output shaft 32. In the first embodiment, when the locking lug 84 of the locking pawl 86 and the parking gear 82 are engaged with each other, in the condition where torque remains in the output shaft 32, for example, the torque is released between the output shaft 32 and the outer teeth 90, namely, between the output shaft 32 and the parking lock gear 92, by means of the springs 108 mounted in the spaces S between the output shaft 32 and the outer teeth 90 Therefore, in the vehicular parking lock device 80, the torque applied from the parking gear 82 to the locking pawl 86 can be reduced or eliminated.

In the vehicular parking lock device 80 of the first embodiment, the parking gear 82 includes the parking lock gear 92 and the parking lock gear base 94. The parking lock gear 92 includes the outer teeth 90 that engage with the locking lug 84, and rotates about the rotation axis C1. The parking lock gear base 94 is fixed to the output shaft 32, such that it can rotate relative to the parking lock gear 92 about the rotation axis C1. The spaces S that expand and contract in the circumferential direction in accordance with relative rotation of the parking lock gear 92 and the parking lock gear base 94 are provided between the parking lock gear 92 and the parking lock gear base 94. In the spaces S, the springs 108 are provided in the pre-compressed state. With this arrangement, when the parking lock device 80 is placed in the locked state in which the locking lug 84 and the parking gear 82 are engaged with each other, in the condition where torque is applied to the output shaft 32, namely, in the condition where torque remains in the output shaft 32, the torque that remains in the output shaft 32 is released by means of the springs 108 provided in the spaces S, and is less likely or unlikely to be applied from the parking gear 82 to the locking lug 84, so that increase of a load on shifting operation can be curbed, for example. Also, since the torque that remains in the output shaft 32 is released by the springs 108 provided in the spaces S, abnormal noise is less likely or unlikely to be generated when the parking gear 82 and the locking pawl 86 are disengaged from each other, as compared with the case where the vehicular parking lock device 80 is placed in the non-locked state in a condition where torque remains in the output shaft 32, for example. Further, wear of the parking gear 82 and the locking pawl 86 due to engagement thereof can be reduced or prevented.

Also, in the vehicular parking lock device 80 of the first embodiment, each of the springs 108 contacts at its one circumferential end portion with the parking lock gear 92, and contacts at the other circumferential end portion with the protruding portion 102 of the parking lock gear base 94. With this arrangement, the torque that remains in the output shaft 32 can be more reliably released by the springs 108.

Also, in the vehicular parking lock device 80 of the first embodiment, the springs 108 are provided between the output shaft 32 and the outer teeth 90 in the radial directions of the parking gear 82. Thus, the torque that remains in the output shaft 32 can be more reliably released by the springs 108, between the output shaft 32 and the outer teeth 90.

Also, in the vehicular parking lock device 80 of the first embodiment, the elastic body mounted in each space S is in the form of the spring. Thus, the torque that remains in the output shaft 32 can be released between the output shaft 32 and the outer teeth 90, by use of more inexpensive components.

Also, in the vehicular parking lock device 80 of the first embodiment, the parking lock gear 92 is provided with the groove portions 96 that extend in the circumferential direction and extend through the gear 92 in the direction of the rotation axis C1, and the parking lock gear base 94 is provided with the protruding portions 102 that are smaller in the circumferential direction than the groove portions 96, and can be inserted into the groove portions 96. Further, the spaces S surrounded by the groove portions 96 and the protruding portions 102 inserted in the groove portions 96 are provided between the parking lock gear 92 and the parking lock gear base 94. Thus, the spaces S are provided in a simple structure between the parking lock gear 92 and the parking lock gear base 94; therefore, the size of the parking gear 82 is less likely or unlikely to be increased.

Next, a parking lock device for a vehicle according to a second embodiment of the disclosure will be described. The same reference numerals are assigned to portions or components common to the first embodiment as described above, and these portions or components will not be further described.

Figure 6:
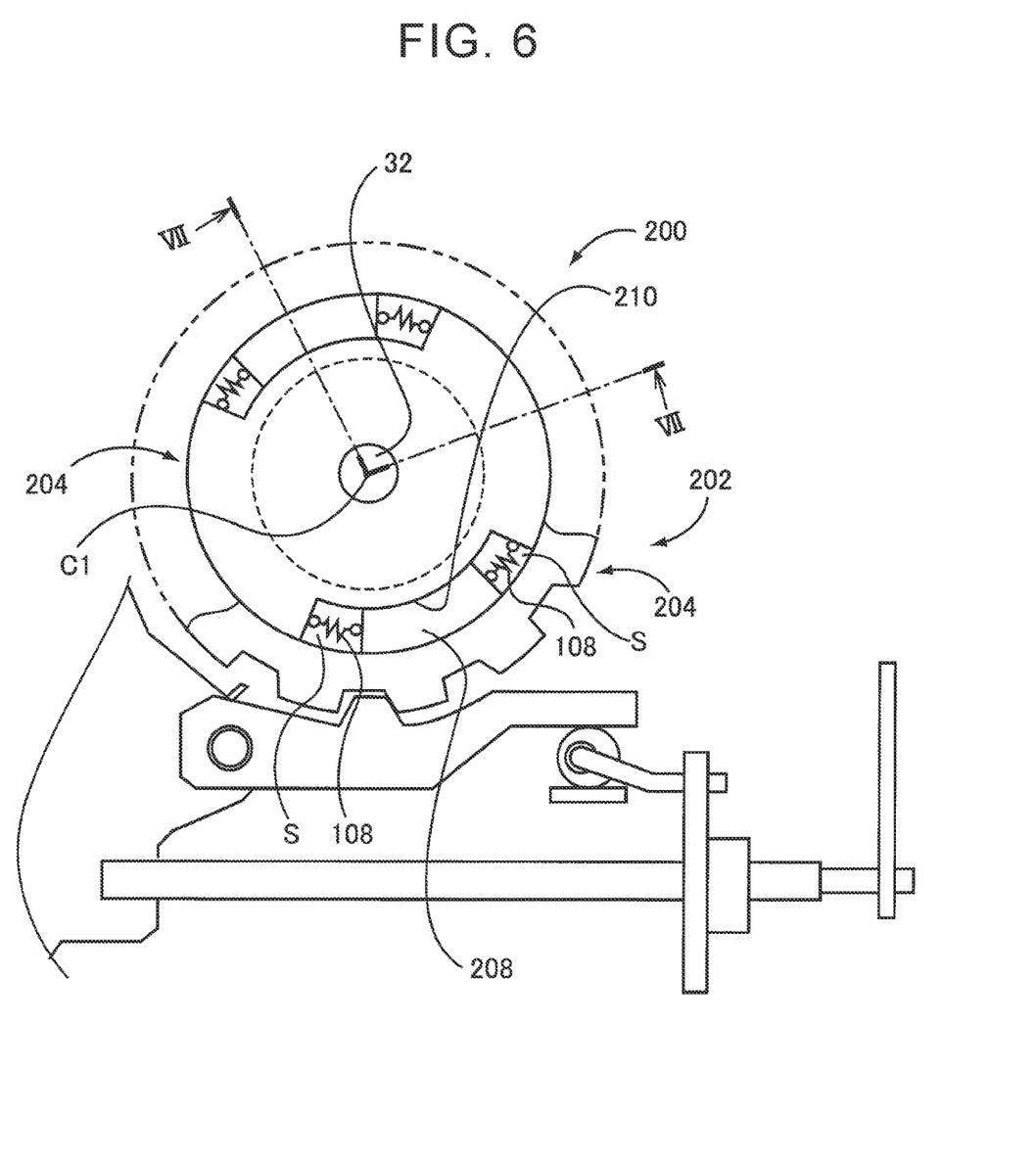
FIG. 6 is a schematic view illustrating the configuration of a vehicular parking lock device according to a second embodiment of the disclosure.
Figure 7:
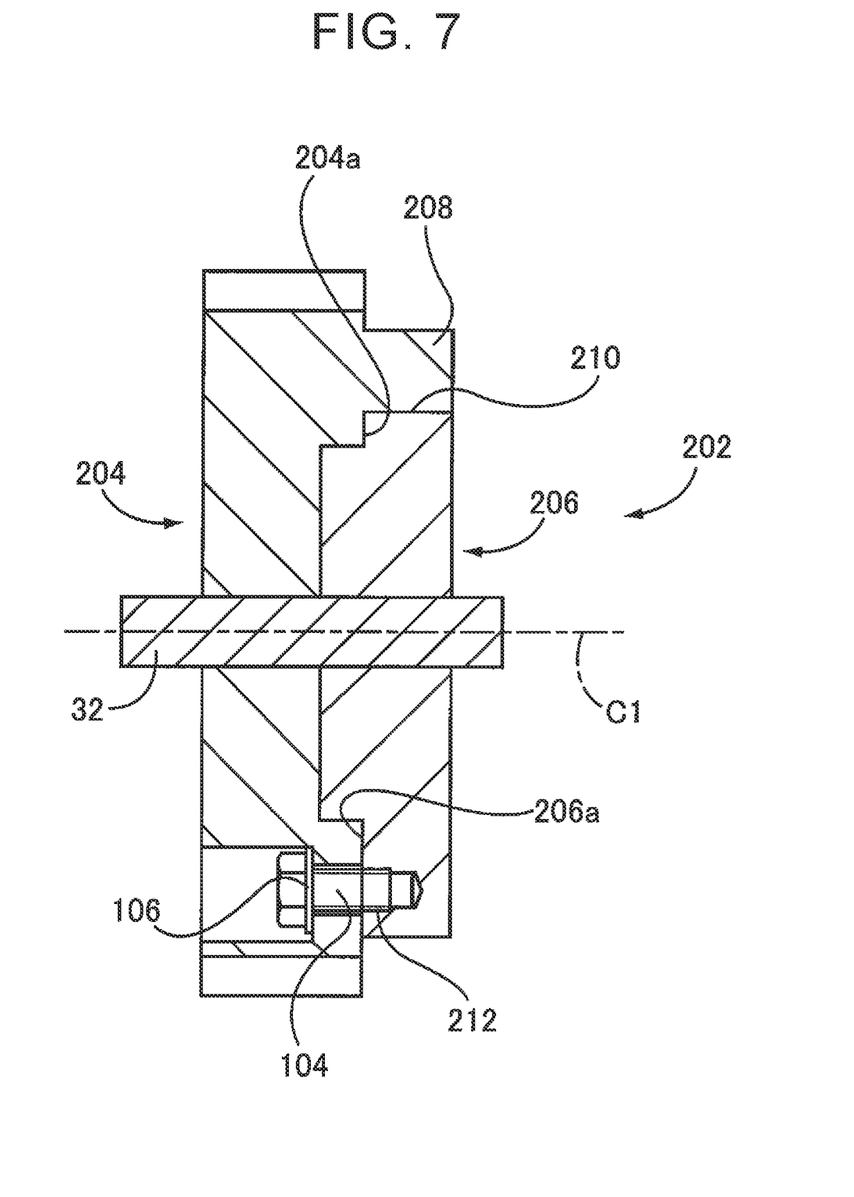
FIG. 7 is a cross-sectional view taken along line VII-VII in FIG. 6, showing a principal part of a parking gear of the vehicular parking lock device of the second embodiment.

FIG. 6 is a schematic view illustrating the configuration of a vehicular parking lock device 200 according to a second embodiment of the disclosure. FIG. 7 is a cross-sectional view taken along line VII-VII in FIG. 6, and shows a principal part of a parking gear 202. The parking gear 202 includes a parking lock gear 204 and a parking lock gear base 206. The parking lock gear 204 can rotate relative to the output shaft 32. The parking lock gear base 206 cannot rotate relative to the output shaft 32, and can rotate relative to the parking lock gear 204.

The parking lock gear 204 is provided with arcuate protruding portions 208 that protrude in the thickness direction of the parking lock gear 204. Each of the protruding portions 208 has a certain length in a radial direction of the parking lock gear 204, and is generally in the form of a fan that extends in the circumferential direction along a rotation circle about the rotation axis C1, for example. The protruding portion 208 protrudes from one side face 204a of the parking lock gear 204 as viewed in the thickness direction, namely, from the side face 204a closer to the parking lock gear base 206, in a condition where the parking lock gear 204 and the parking lock gear base 206 are located adjacent to each other in the thickness direction, namely, in the direction of the rotation axis C1, to overlap each other. Two or more protruding portions 208 are provided at given intervals in the circumferential direction of the side face 204a. In the second embodiment, a total of two protruding portions 208 are provided at substantially equal intervals on the parking lock gear 204.

The parking lock gear base 206 is provided with arcuate groove portions 210 formed by cutting out parts of the outer periphery in the thickness direction. Two or more groove portions 210 are provided at given intervals in the circumferential direction of the parking lock gear base 206. Each of the groove portions 210 has a certain length in a radial direction of the parking lock gear base 206, and is generally in the form of a fan that extends in the circumferential direction, along the outer periphery as a rotation circle about the rotation axis C1, for example. The protruding portions 208 are provided in the groove portions 210 such that the protruding portions 208 can engage with the groove portions 210. In the second embodiment, a total of two groove portions 210 are provided at substantially equal intervals in the parking lock gear base 206. The groove portions 210 are larger in the circumferential direction than the protruding portions 208 (namely, the protruding portions 208 that can be inserted into the groove portions 210 are smaller in the circumferential direction than the groove portions 210), and spaces S are provided in the circumferential direction between the groove portions 210 and the protruding portions 208. The spaces S are provided at circumferentially opposite sides of each protruding portion 208, and the springs 108 are provided in the spaces S.

As shown in FIG. 7, female screw holes 212 each having a certain depth are provided at given intervals in the circumferential direction of the parking lock gear base 206, such that the holes 212 are open to a side face 206a closer to the parking lock gear 204. Bolts 104 provided in the parking lock gear 204 are screwed into the female screw holes 212 via washers 106, for example. In the second embodiment, a total of two female screw holes 212 are provided at substantially equal intervals in the parking lock gear base 206.

Thus, in the vehicular parking lock device 200 of the second embodiment, the parking lock gear 204 is provided with the protruding portions 208, and the parking lock gear base 206 is provided with the groove portions 210, such that the spaces S are provided between the parking lock gear 204 and the parking lock gear base 206. With the springs 108 provided in the spaces S, when the vehicular parking lock device 200 is placed in the locked state, in a condition where torque remains in the output shaft 32, for example, the torque that remains in the output shaft 32 can be released by means of the springs 108 provided in the spaces S. Further, the spaces S are provided in a simple structure between the parking lock gear 204 and the parking lock gear base 206, so that the size of the parking gear 82 is less likely or unlikely to be increased.

Figure 8:
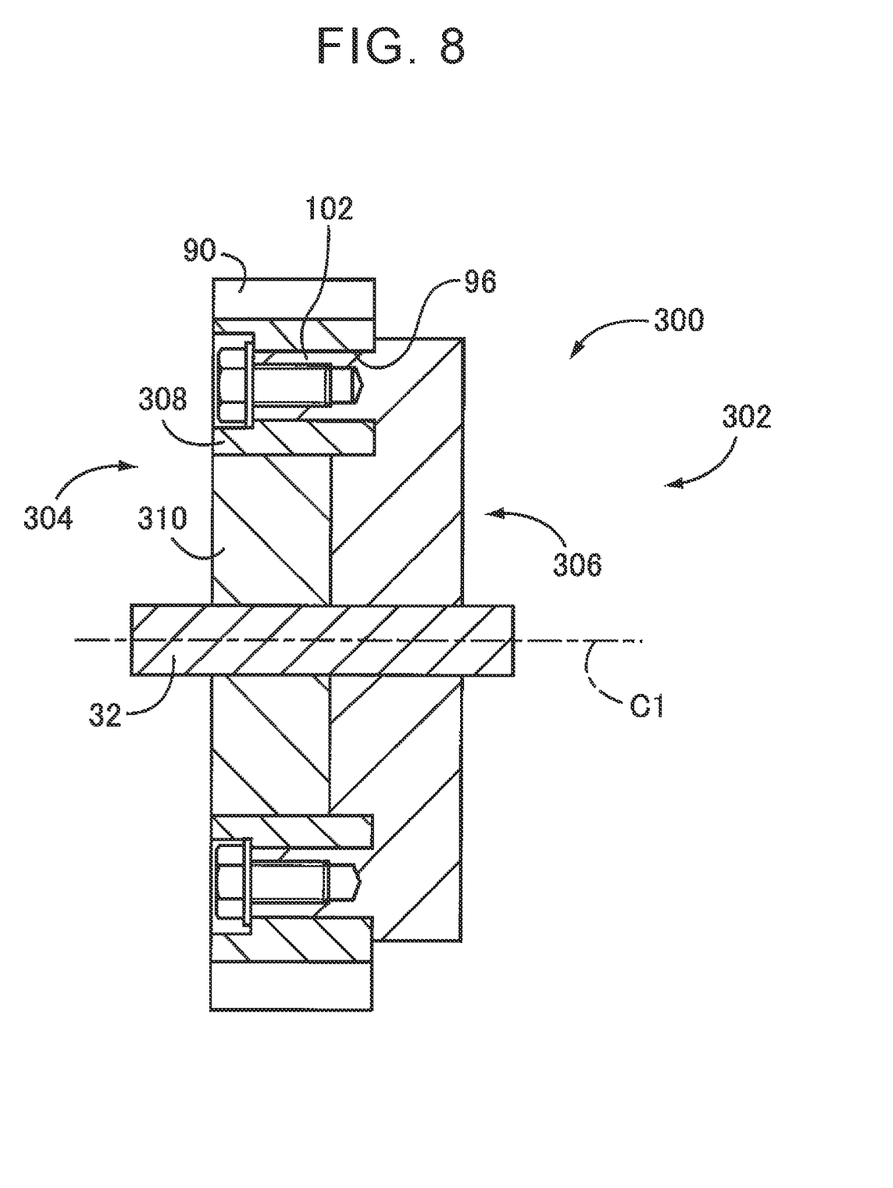
FIG. 8 is a cross-sectional view showing a principal part of a parking gear of a vehicular parking lock device according to a third embodiment of the disclosure.

FIG. 8 is a cross-sectional view showing a principal part of a parking gear 302 of a vehicular parking lock device according to a third embodiment of the disclosure. The cross-sectional view of FIG. 8 corresponds to FIG. 3 of the first embodiment, and FIG. 7 of the second embodiment. As shown in FIG. 8, the parking gear 302 includes a parking lock gear 304 and a parking lock gear base 306. The parking lock gear 304 can rotate relative to the output shaft 32. The parking lock gear base 306 cannot rotate relative to the output shaft 32, and can rotate relative to the parking lock gear 304.

As shown in FIG. 8, the parking lock gear 304 includes an annular ring portion 308 on which outer teeth 90 are provided, and a main body portion 310 provided radially inward of the ring portion 308. Arcuate groove portions 96 are provided in the ring portion 308, and arcuate protruding portions 102 provided on the parking lock gear base 306 can be inserted into the groove portions 96. The ring portion 308 cannot rotate relative to the main body portion 310.

Thus, since the parking lock gear 304 includes the ring portion 308 and the main body portion 310 in the vehicular parking lock device 300 of the third embodiment, the shape of the parking lock gear 304 can be determined with an increased degree of freedom, and the degree of freedom in terms of design can be improved.

While the main body portion 310 cannot rotate relative to the ring portion 308 in the third embodiment, the main body portion 310 may be arranged to be able to rotate relative to the ring portion 308, and arranged to be unable to rotate relative to the parking lock gear base 306. In this case, the parking lock gear 304 including the ring portion 308 is provided on the output shaft 32 such that the gear 304 can rotate relative to the output shaft 32, and the parking lock gear base 306 is provided on the output shaft 32 such that the gear base 306 cannot rotate relative to the output shaft 32.

While the first, second, and third embodiments of the disclosure have been described in detail based on the drawings, the disclosure is not limited to these embodiments, but may be embodied in other forms.

For example, the spring 108 is provided in the space S in each of the illustrated embodiments, but an elastic body, such as rubber, may be provided in the space S.

In the first embodiment, the female screw holes 102b into which the bolts 104 that fix the parking lock gear 92 with the parking lock gear base 94 are screwed are provided in the protruding portions 102 of the parking lock gear base 94. However, the disclosure is not limited to this arrangement, but the female screw holes 102b may be provided in the parking lock gear 92. In this case, the bolts 104 are inserted from the parking lock gear base 94.

While the first, second, and third embodiments of the disclosure have been described in detail based on the drawings, these embodiments are merely examples, and the disclosure may be embodied with various modifications and improvements, based on the knowledge of those skilled in the art, without departing from the principle of the disclosure.

What is claimed is:

1. A parking lock device for a vehicle, comprising:
a parking gear provided on a rotating member connected to a drive wheel;
a locking pawl including a locking lug capable of engaging with the parking gear, the locking pawl being configured to be pivotally turned between a locked state in which the locking lug is engaged with the parking gear, and a non-locked state in which the locking lug is disengaged from the parking gear; and
a cam mechanism including a locking cam inserted between a position fixed member and the locking pawl, and configured to pivotally turn the locking pawl by moving the locking cam in parallel with a rotation axis of the parking gear,
wherein the parking gear includes a parking lock gear including a plurality of outer teeth adapted to engage with the locking lug and configured to rotate about the rotation axis, and a parking lock gear base fixed to the rotating member and configured to rotate relative to the parking lock gear about the rotation axis,
wherein a space is provided between the parking lock gear and the parking lock gear base, the space being configured to expand and contract in a circumferential direction in accordance with relative rotation of the parking lock gear and the parking lock gear base, and
wherein an elastic body is provided in the space in a pre-compressed state.

2. The parking lock device according to claim 1, wherein:
the outer teeth are arranged at substantially equal intervals in an outer peripheral portion of the parking lock gear; and
the locking pawl is placed in the locked state when the locking lug provided on the locking pawl is engaged with the outer teeth, and is placed in the non-locked state when the locking lug is disengaged from the outer teeth.

3. The parking lock device according to claim 1, wherein:
the elastic body includes a first circumferential end portion in the circumferential direction, the first circumferential end portion being in contact with the parking lock gear; and
the elastic body includes a second circumferential end portion in a circumferential direction, the second circumferential end portion being in contact with the parking lock gear base, the second circumferential end portion being opposite to the first circumferential end portion.

4. The parking lock device according to claim 1, wherein the elastic body is provided between the rotating member and the outer teeth as viewed in a radial direction of the parking gear.

5. The parking lock device according to claim 1, wherein the elastic body comprises a spring.

6. The parking lock device according to claim 1, wherein:
the parking lock gear is provided with a groove portion that extends in the circumferential direction and extends through the parking lock gear in a direction of the rotation axis;
the parking lock gear base is provided with a protruding portion that is smaller in the circumferential direction than the groove portion and is allowed to be inserted into the groove portion; and
the space is provided between the parking lock gear and the parking lock gear base, such that the space is surrounded by the groove portion and the protruding portion, the protruding portion being inserted into the groove portion.

7. The parking lock device according to claim 1, wherein:
the parking lock gear base is provided with a groove portion that extends in the circumferential direction and extends through the parking lock gear base in a direction of the rotation axis;
the parking lock gear is provided with a protruding portion that is smaller in the circumferential direction than the groove portion and is allowed to be inserted into the groove portion; and
the space is provided between the parking lock gear and the parking lock gear base, such that the space is surrounded by the groove portion and the protruding portion, the protruding portion being inserted into the groove portion.

* * * * *